United States Patent
Apte et al.

(10) Patent No.: US 9,747,163 B2
(45) Date of Patent: Aug. 29, 2017

(54) PRE-POPULATION OF DATA FOR REPLICATION OF DATA BACKUPS

(71) Applicant: Druva Technologies Pte. Ltd., Singapore (SG)

(72) Inventors: Anand Apte, Pune (IN); Somesh Jain, Indore (IN); Milind Borate, Pune (IN); Shekhar S. Deshkar, Pune (IN)

(73) Assignee: DRUVA TECHNOLOGIES PTE. LTD., Singapore (SG)

( * ) Notice: Subject to any disclaimer, the term of this patent is extended or adjusted under 35 U.S.C. 154(b) by 330 days.

(21) Appl. No.: 14/682,089

(22) Filed: Apr. 8, 2015

(65) Prior Publication Data
US 2015/0302025 A1    Oct. 22, 2015

(30) Foreign Application Priority Data

Apr. 10, 2014  (IN) .......................... 1318/MUM/2014

(51) Int. Cl.
| | | |
|---|---|---|
| *G06F 7/02* | (2006.01) | |
| *G06F 17/30* | (2006.01) | |
| *G06F 11/14* | (2006.01) | |
| *G06F 11/20* | (2006.01) | |

(52) U.S. Cl.
CPC ...... *G06F 11/1402* (2013.01); *G06F 11/1448* (2013.01); *G06F 11/1464* (2013.01); *G06F 17/30212* (2013.01); *G06F 17/30575* (2013.01); *G06F 11/202* (2013.01)

(58) Field of Classification Search
None
See application file for complete search history.

(56) References Cited

U.S. PATENT DOCUMENTS

| | | | | |
|---|---|---|---|---|
| 2006/0015779 | A1* | 1/2006 | Nissan-Messing | G06F 11/2074 714/47.1 |
| 2007/0214330 | A1* | 9/2007 | Minami | G06F 11/1458 711/162 |
| 2013/0318040 | A1* | 11/2013 | Park | G06F 17/30212 707/623 |

FOREIGN PATENT DOCUMENTS

CN      101247349 A    *    8/2008

\* cited by examiner

*Primary Examiner* — Bruce Moser
(74) *Attorney, Agent, or Firm* — Fenwick & West LLP

(57) ABSTRACT

A system and a method are disclosed for pre-seeding data to backup servers and determining servers for additional backups. Backup data is received from a client device through a first backup request and sent to a primary server for storage. Additional backup data from a second backup request is received. After the initial backup data is stored on the primary server and pre-seeded by the primary server on a secondary server, a status of backup servers associated with the client device is received. The backup servers include the primary server and can include the secondary server. Responsive to the status indicating availability of a server in the backup servers, a recipient server is identified from the backup servers and the additional backup data is sent to the identified recipient server.

36 Claims, 6 Drawing Sheets

PRE-POPULATION OF DATA FOR REPLICATION OF DATA BACKUPS

CROSS REFERENCE TO RELATED APPLICATIONS

This application claims a benefit of, and priority to, India Patent Application No. 1318/MUM/2014, filed Apr. 10, 2014, the contents of which is incorporated by reference in its entirety.

BACKGROUND

1. Field of Art

The disclosure generally relates to the field of data storage systems and, in particular, to multiple data backups in data storage systems.

2. Description of the Related Art

As computers, smart phones, tablets, laptops, servers, and other electronic devices increase in quantity and in performance year to year, the data they generate also increases. Individuals and enterprises back up their local data on their designated server to ensure retrieval of their local data in case the local data is lost on their electronic device. The local data is backed up in case the local data is lost on their electronic device. The backed up local data, however, is also at risk of being lost in the case the servers malfunction or another destructive event occurs. Conventional methods for data backup are inefficient and still include risk of losing the local data at the server level.

BRIEF DESCRIPTION OF DRAWINGS

The disclosed embodiments have advantages and features which will be more readily apparent from the detailed description, the appended claims, and the accompanying figures (or drawings). A brief introduction of the figures is below.

DETAILED DESCRIPTION

Figure 1A:
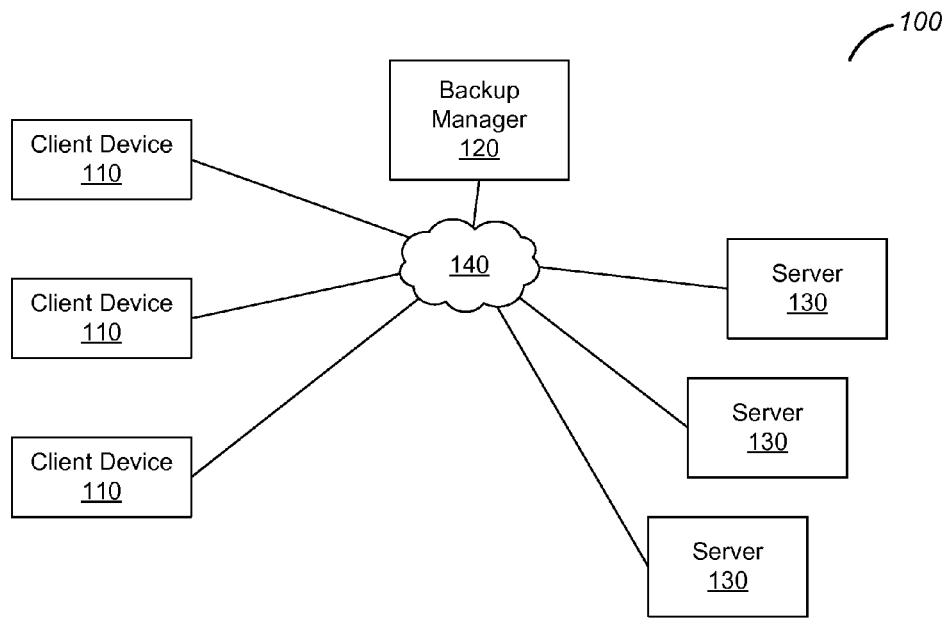
FIGS. 1A and 1B illustrate a general and specific backup management environment, respectively, in accordance with an embodiment.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system, method and computer readable storage medium that includes a system and a method for pre-seeding data to one or more backup servers and determining servers for additional backups. Backup data is received from a client device through a first backup request and sent to a primary server for storage. Additional backup data is then received from the client device through a second backup request from the client device. After the backup data is stored on the primary server and pre-seeded by the primary server on a secondary server, the backup manager receives a status of one or more backup servers associated with the client device, the one or more backup servers including the primary server, the secondary server, or any combination thereof. Responsive to the status indicating availability of the primary server, secondary server, or one or more backup servers associated with the client device, a recipient server is identified. The recipient server can be the primary server or the secondary server, for example. In the embodiment where the associated backup servers of the client device include additional servers as well as the primary and secondary server, the recipient server is any server among the associated backup servers. The additional backup data is sent to the identified recipient server. The additional backup data can be metadata associated with the initially stored backup data. Further, the additional backup data can be new data, metadata, or any combination thereof. In one embodiment, responsive to the status indicating lack of availability of a specified number of servers of the one or more backup servers, the additional data is sent to a pre-designated server. The pre-designated server can be the primary server or any server that stored the initial backup data.

The disclosed system and method initially backs up data from the client device to a primary server and the primary server then seeds the backed up data to additional servers (i.e., secondary servers, tertiary servers, etc.). After the initial seeding from the primary server to the additional servers, any additional data to back up (i.e., metadata) from the client device is sent directly from the client device to any of the servers, including the primary and additional servers. The disclosed system and method does not rely too heavily on one server for back up, does not increase bandwidth on the client device end (i.e., only the primary server has increased bandwidth), and efficiently stores metadata to any of the servers without having to direct back up through a single server (i.e., primary server).

System Overview

FIG. 1 and the other figures use like reference numerals to identify like elements. A letter after a reference numeral, such as "130A," indicates that the text refers specifically to the element having that particular reference numeral. A reference numeral in the text without a following letter, such as "130," refers to any or all of the elements in the figures bearing that reference numeral (e.g. "130" in the text refers to reference numerals "130A" and/or "130B" in the figures).

FIG. 1A illustrates one embodiment of a general backup management environment 100, which comprises a backup manager 120 that provides data backup services to client devices 110 over a network 140 through one or more servers 130. A client device 110 may send a backup request for a file, metadata, or other suitable data to the backup manager 120. The client device 110 can be any computing device that has data that requires backup. Examples of such a device include a personal computer (PC), a desktop computer, a notebook, a tablet computer, or any other suitable electronic device. Examples also include a device executing an operating system, for example, a MICROSOFT WINDOWS-compatible operating system (OS), APPLE OS X or iOS, GOOGLE ANDROID and/or a LINUX distribution. The client device 110 can also be any device having computer functionality, such as a personal digital assistant (PDA), a mobile telephone, a smartphone, a device executing the APPLE iOS operating system, the GOOGLE ANDROID operating system, WINDOWS MOBILE operating system, or WEBOS operating system. Computer functionality is described further in conjunction with FIG. 6. The client device 110 may also be a server device that requires backup, such as a web server (running for example APACHE), a file server, a database server, etc. Although such server devices may perform server functions in an organization, from the point of view of the backup manager 120, they are treated like any other client device that requires data backup services.

The backup manager 120 receives a request from the client device 110 to upload data for backup or storage on the one or more servers 130. The backup manager 120 also retrieves data that has been backed up or stored previously on the one or more servers 130. The backup manager 120 can determine servers associated with a client using a client device 110. In addition, the backup manager 120 can determine to which server to back up data or metadata. The method used by the backup manager 120 to back up data reduces an amount of time or computation time at the end of the client device 110 during backup operations, as further described in conjunction with FIGS. 3, 4, and 5. In one embodiment, the backup manager 120 may be implemented using one or more computer servers that have a network communications capability. In another embodiment, the backup manager 120 is implemented using cloud services such as AMAZON WEB SERVICES or MICROSOFT AZURE.

The interaction between the client device 110, the backup manager 120, and the one or more servers 130 are typically performed via a network 140, for example, via the internet. The network 140 enables communications between the client device 110 and the backup manager 120 as well as with the one or more servers 130. In one embodiment, the network 140 uses standard communications technologies and/or protocols. Thus, the network 140 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 101 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc.

The data exchanged over the network 140 can be represented using technologies and/or formats including the hypertext markup language (HTML), the extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 140 can also include links to other networks such as the internet.

Figure 1B:
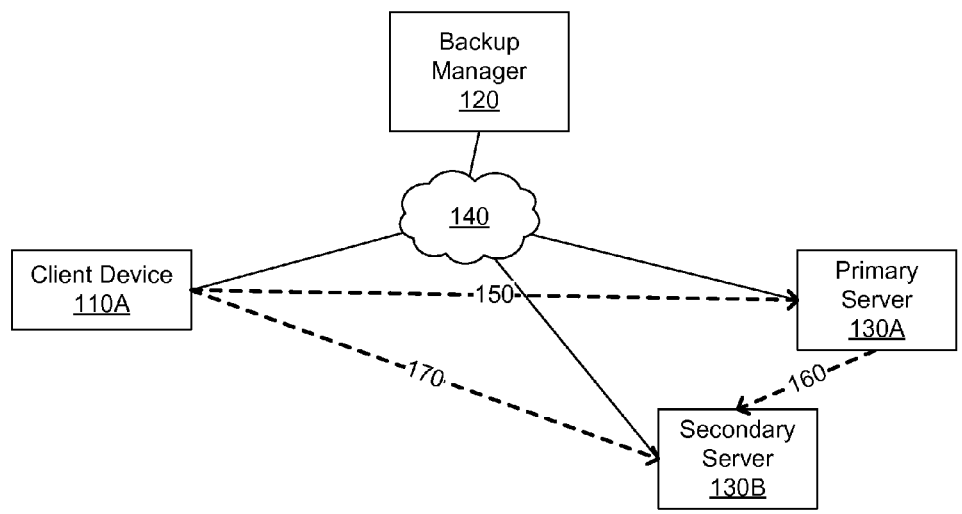

Referring now to FIG. 1B, illustrated is one embodiment of a specific backup management environment 100, which comprises the backup manager 120. The backup manager 120 provides data backup services to a client device 110A over the network 140. In the embodiment shown in FIG. 1B, the client device 110A is associated with a primary server 130A and a secondary server 130B. When the client device 110A sends a backup request to store a file, metadata, or other suitable data to the backup manager 120, the backup manager 120 determines whether to send the data for backup to the primary server 130A or the secondary server 130B. Therefore, the initial back up data is stored on a plurality of servers at expense of the primary server's bandwidth for example which does not increase bandwidth on the client device end and ensures an additional back up on the server side. Any additional metadata back up from the client device can then be sent directly, via the backup manager 120, to any of the servers (i.e., primary server, secondary server, etc.). For example, if the backup request is the first backup request received from the client device 110A, the backup data is stored on the primary server 130A. If the backup request is not the first backup request, the backup manager 120 determines whether the primary server 130A or the secondary server 130B will backup the data. The method for determining a server to backup data to is described further in conjunction with FIGS. 3, 4, and 5.

Data transmission and direction of the transmission is shown through 150, 160, and 170 in FIG. 1B. If the backup request is the first backup request received by the backup manager 120 for the client device 110A, the backup data is sent to the primary server 130A, as shown in 140. Once the backup data is stored on the primary server 130A, the backup data is seeded to the secondary server 130B, as shown in 160. In another embodiment, the seeding of the backup data to the secondary server 130B occurs while the backup data is stored on the primary server 130A. Additional backups are sent to the secondary server 130B, as shown in 170 or the primary server 130A, as shown in 150.

For example, if the client device 110A is initially seeding 10 GB of backup data, the 10 GB of backup data is sent 150 from the client device 110A to the primary server 130A by the backup manager 120. The 10 GB of backup data is pre-seeded 160 from the primary server 130A to the secondary server 130B. Thus, the primary server 130A and the secondary server 130B both have the initial 10 GB of backup data. Every additional backup request after the initial backup request is sent either to 150 the primary server 130A or to 170 the secondary server 130B based on the previous backup request. The additional backup requests will typically not have 10 GB of backup data but rather only metadata to backup. The metadata backup can be any amount of data and will typically be less than the initial backup data of 10 GB.

If the backup manager 120 receives an additional backup request from the client device 110A after the first backup request, the backup manager 120 determines whether additional backup data from the additional backup request is stored. The backup manager 120 determines whether the primary server 130A or the secondary server 130B stores the additional backup data, for example, based on time stamps of recent backups. The process of the backup manager 120 is described further in conjunction with FIGS. 3, 4, and 5. Herein, the methods and processes are described reflecting the specific backup management environment 100. However, a client device 110 can backup data to other servers, including a primary server 130A and a secondary server 130B.

Figure 2:
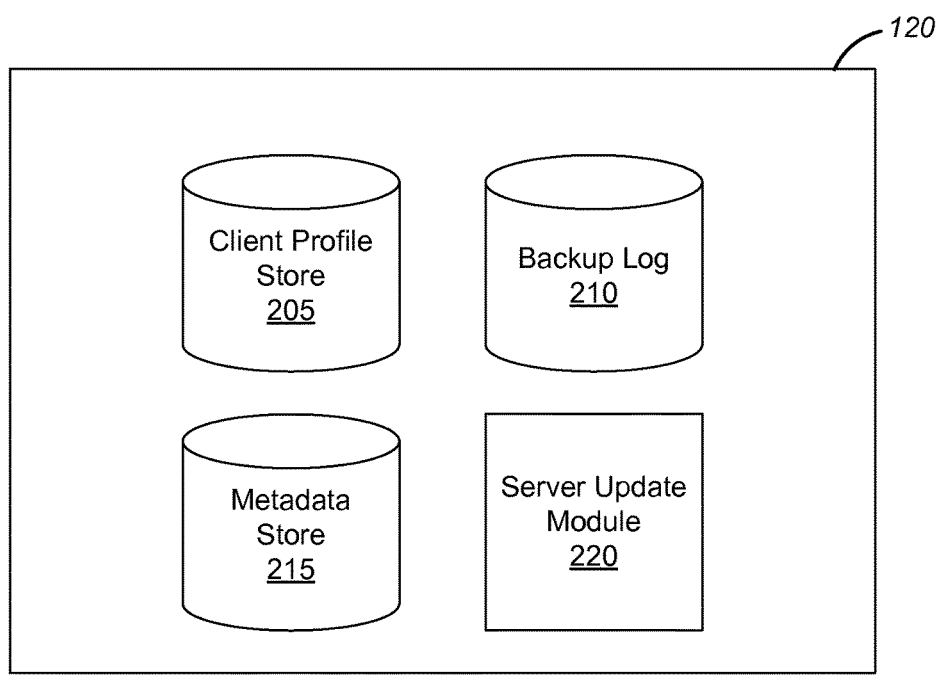
FIG. 2 illustrates a block diagram of a backup manager in accordance with an embodiment.

FIG. 2 illustrates a block diagram of an embodiment of the backup manager 120. The backup manager 120 shown in FIG. 2 includes a client profile store 205, a backup log 210, a metadata store 215, and a server update module 220. In other embodiments, the backup manager 120 may include additional, fewer, or different components for various applications.

When the backup manager 120 receives a request from a client device 110A for a back up, the backup manager 120 accesses information associated with the client device 110A from the client profile store 205, determines a recent backup time associated with the client device 110A through the backup log 210, determines whether backup is necessary based on the metadata store 215, and, if applicable, sends instructions for backing up the client device 110A through the server update module 220. The functions of the backup manager 120 are described further in conjunction with FIGS. 3, 4, and 5.

The client profile store 205 stores identifications for client devices 110 and identifications of one or more servers 130 associated with a client device 110. As described in this example, the client device 110A may be associated with a plurality of servers 130, such as a primary server 130A and a secondary server 130B, as shown in FIG. 1B. The identification of the client device 110A and the primary 130A and secondary 130B servers are stored in the client profile store 210. For example, the identification of the servers 130A and 130B can be stored with an association to the identification of the client device 110A. In one embodiment, the client profile store 205 also stores a time stamp of a most recent back up of the client device 110A as well as to which server 130 (i.e., 130A or 130B) the backup was stored. In another embodiment, the time stamp information is stored in the backup log 210.

The backup log 210 stores a specified number of time stamps associated with the client device 110A. For example, the client device 110A may have had hundreds of previous backups but the backup log 210 would store a specified number, for example 10, recent backup time stamps. The specified number of recent backup time stamps can be specified by the client device 110A, a client of the client device 110A, or by the backup manager 120.

The metadata store 215 stores a specified number of previous metadata associated with the client device 110A. For example, the specified number of previous metadata can be specified by the client device 110A or the backup manager 120 and can range from no previous metadata being backed up to 10 or more recent metadata backups being backed up. Optionally, a specified number of most recent metadata can be stored in the client profile store 205 with an association with the client device 110A. When a backup request is received, the backup manager 120 can check whether the backup is necessary by checking metadata received from the client device 110A and the metadata stored on the primary 130A or secondary 130B server.

Once a request from the client device 110A for backup is received, the server update module 220 accesses the client profile store 205 for information of the client device 110A and identifications of the primary 130A and secondary 130B servers. Based on the time stamp of a most recent backup, for example accessed from the backup log 210, the server update module 220 determines a specific server from the associated primary 130A and secondary 130B servers. In one embodiment, the server update module 220 determines whether a backup is necessary based on metadata from a most recent backup stored in the metadata store 215.

Initial Pre-Seeding of Backup Data

Figure 3:
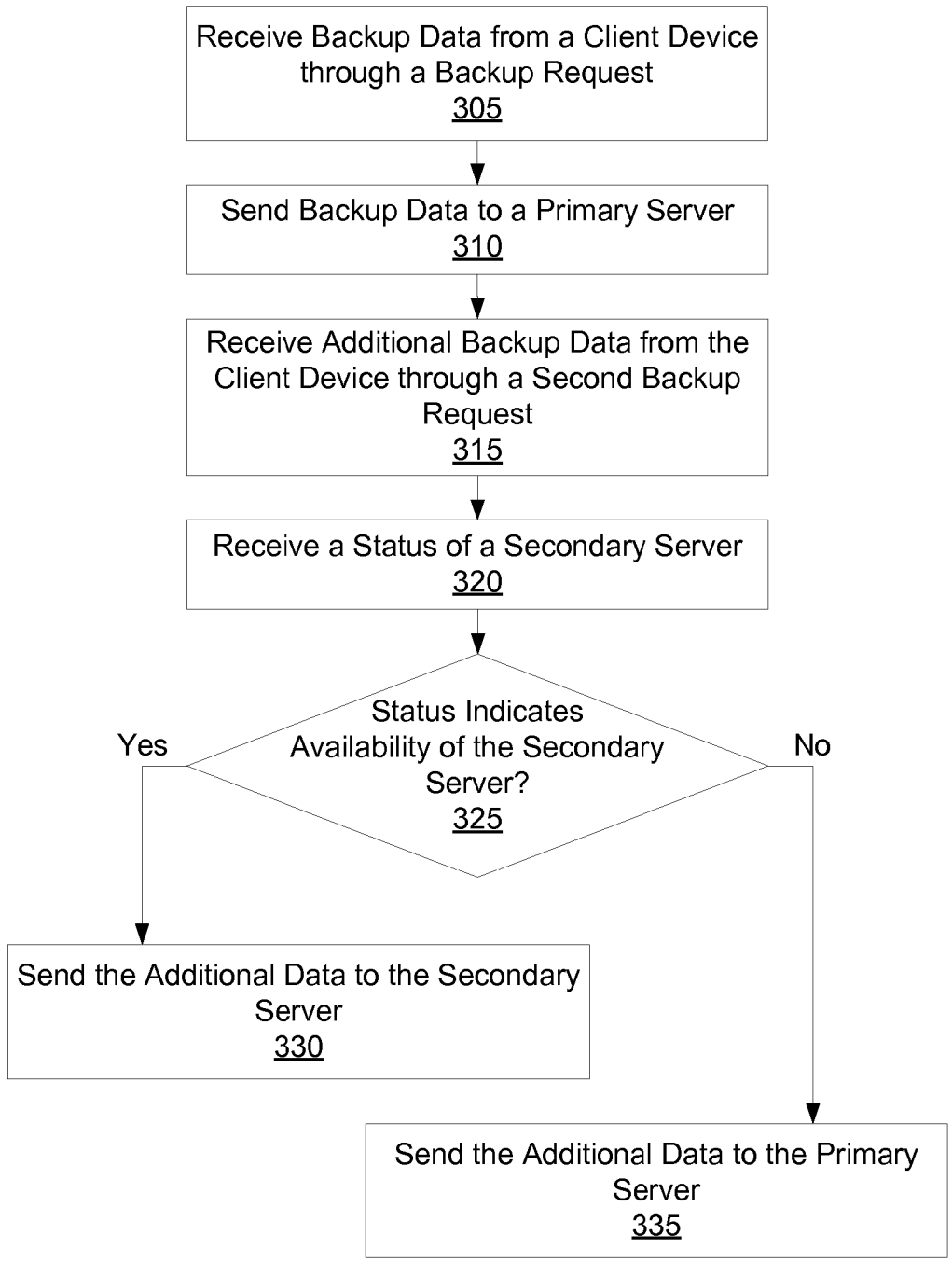
FIG. 3 illustrates a flowchart of a method for pre-seeding data for backup in accordance with an embodiment.

Turning now to FIG. 3, it illustrates a flowchart of one embodiment of a method for pre-seeding data to one or more backup servers by the backup manager 120. In other embodiments, the method may include different and/or additional steps than those shown in FIG. 3. The functionality described in conjunction with the backup manager 120 in FIG. 3 may be provided by the server update module 220 of the backup manager 120, in one embodiment, or may be provided by any other suitable component, or components, in other embodiments. Additionally, the client device 110 may execute one or more instructions associated with the backup manager 120, such as an application associated with the backup manager 120, to provide the functionality described in conjunction with FIG. 3.

In one example, the backup manager 120 receives 305 backup data from a client device 110A through a first backup request. A backup request is a request to backup data from a client device 110 to one or more servers 130. The backup request comprises backup data and can also be associated with a time stamp and/or other instructions for executing the backup request. Backup data can be files, metadata, and/or any other suitable data that can be stored on one or more servers 130. The other instructions for executing the backup request can include identification of a server for backup if the client device 110A already has associated backup servers 130, such as the primary server 130A and the secondary server 130B. A backup request can be received from the client device 110A or an application associated with the backup manager 120 running on the client device 110A.

A user of the client device 110A can transmit the backup request manually. Alternatively, the backup request can be sent automatically from the client device 110A at a specified time interval. The specified time interval is a time interval at which the client device 110A automatically backs up data and can be specified by a user of the client device 110A, an application associated with the backup manager 120 running on the client device 110A, or by the backup manager 120. In one embodiment, the specified time interval is an interval at which the backup manager 120 automatically executes a backup through a pre-designated primary server 130A. In another embodiment, the backup manager 120 can also be programmed to automatically execute a backup request. Information, such as the specified time interval, identifications of the associated backup servers 130, and information about the client device 110A such as an identification of the client device 110A can be stored in or accessed from the client profile store 205. The time stamp of the backup request can be stored in the backup log 210.

The backup data is sent or transmitted 310 to a primary server 130A for storage. A primary server can be a server associated with the client device 110 and be selected from one or more backup servers 130 associated with the client device 110. The primary server 130A is the server that is first sent backup data of the client device 110A. In addition, the primary server 130A pre-seeds an additional or secondary server 130B associated with the client device 110A with the received first sent backup data of the client device 110A. Thus, if the primary server 130A is sent 10 GB of backup data, the primary server 130A will first store the 10 GB of backup data. Then, the primary server 130A will pre-seed the secondary server 130B with the 10 GB of backup data.

Pre-seeding the secondary server 130B by the primary server 130B provides a second backup of the 10 GB of backup data in case something happens to the primary server 130B. This second backup of the 10 GB happens with no increased bandwidth on the client device end since the primary server 130B is pre-seeding the data. In addition, it minimizes backup time for the client device 110A during backup of two backup servers instead of one backup server. Identification of the primary server 130A can be stored with an association with a time stamp in the client profile store 205 or in the backup log 210.

The backup manager 120 receives 315 additional backup data from the client device 110A through a second backup request. The additional data can be data associated with changes to the previously backed up and pre-seeded data. For example, the additional data can be metadata of modifications to the initially stored and pre-seeded 10 GB of backup data. In addition, the additional data can be any new data not previously stored in the previously backed up and pre-seeded data. For example, the metadata to store can be 1 MB or any other data amount less than the original pre-seeded 10 GB of backup data. As previously described in step 305, backup requests can be received from the client device 110A or an application associated with the backup manager 120 running on the client device 110A. Alternately, a user of the client device 110A can transmit a request sent automatically or manually at a specified time interval. In another embodiment, a programmed backup manager 120 can automatically execute the request.

In one embodiment, the specified time interval for backup associated with the second backup request is not the same as the specified time interval associated with the first backup request. For example, the specified time interval associated with the second backup request is a time interval at which the backup manager 120 automatically executes a backup through a pre-designated secondary server 130B. Information, such as the specified time interval, identifications of the associated primary 130A and secondary 130B servers, and information about the client device 110A can be stored in or accessed from the client profile store 205. The time stamp of the backup request can be stored in the backup log 210.

A status of a secondary server 130B is received 320 by the backup manager 120. A status of a server is an indication of whether the server is available to receive and backup data. For example, the status of a server can claim or indicate complete storage of an initial backup data, indicating the server is available to receive metadata or additional backup data for storage. The status can also indicate an amount of time before the server is available to receive and backup data or any other suitable information regarding availability of the server. In alternative embodiments, the status can be a status of one or more backup servers, including the primary 130A and secondary 130B server, associated with the client device 110A. The status can be received from the client device 110A or an application associated with the client device 110A and can be sent along with a backup request.

Responsive to the status indicating 325 availability of the secondary server 130B, the additional data is sent or transmitted 330 to the secondary server 130B directly. For example, availability of the secondary server 130B means that the pre-seeded data on the secondary server 130B from the primary server 130A is also completely pre-seeded. A secondary server 130B associated with a client device 110A is not the primary server 130A associated with the client device 110A and can also be selected from a plurality of backup servers 130 associated with the client device 110A. The secondary server 130B is the server that is pre-seeded 160 with backup data by the primary server 130A. Following the example of backing up 10 GB, the secondary server 130B receives the 10 GB from the primary server 130A, which first receives the initial 10 GB of backup data from the client device 110A. The additional data can be sent 330 when the primary server 130A has completely backed up the backup data or while the primary server 130A is backing up the backup data. By pre-seeding the secondary server 130B with the initial backup data from the client device 110A, backup time for the client device 110A during a backup is minimized and ensures that the initial backup data is also backed up on another server besides the primary server 130A. In addition, any additional data to backup can be sent directly to either the primary server 130A or another backup server (i.e., the secondary server 130B). Identification of the secondary server 130B can be stored with an association with a time stamp of the pre-seeding backup on the secondary server 130B in the client profile store 205 or in the backup log 210.

Responsive to the status indicating 325 lack of availability of the secondary server 130B, the additional backup data is sent or transmitted 335 to the primary server 130A. If the primary server 130A has not completely backed up the backup data when sent the additional backup data through the second backup request, the additional backup data is not stored right away. If the primary server 130A has completely backed up the backup data but pre-seeding of the backup data on the secondary server 130B has not completed yet, the additional backup data can be stored along with the initial backup data on the primary server 130A.

In another embodiment, the method for pre-seeding data to one or more backup servers is performed by the client device 110A. Then, the functions of the backup manager 120 can be performed by the client device 110A or an application running on the client device 110A. The client device 110A can send 310 backup data to a primary server 130A for storage. The client device 110A can also receive 320 a status of a secondary server 130B, the primary server 130A or any combination thereof. Responsive to the status indicating 325 availability of the secondary server 130B, the client device 110A sends 330 additional data to the secondary server 130B. Responsive to the status indicating 325 lack of availability of the secondary server 130B, the client device 110 sends 335 the additional backup data to the primary server 130A.

Server Determination for Backup

Figure 4:
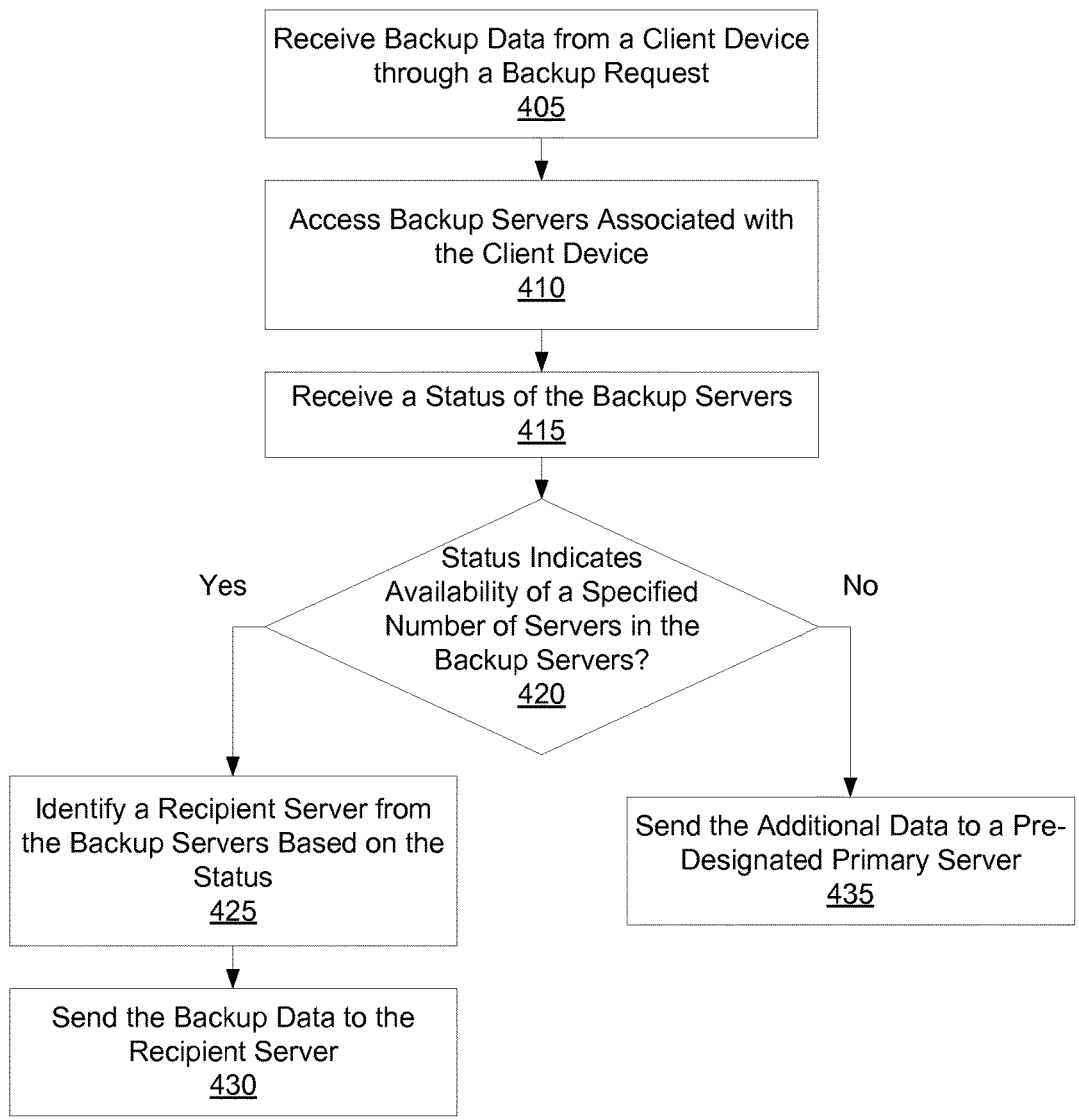
FIG. 4 illustrates a flowchart of a method for determining a backup server in accordance with an embodiment.

Referring now to FIG. 4, it illustrates a flowchart of one embodiment of a method for determining a server to send backup data. For example, the backup manager 120 determines the server to send backup data and performs the method described in FIG. 4. In other embodiments, the method may include different and/or additional steps than those shown in FIG. 4. The functionality described in conjunction with the backup manager 120 in FIG. 4 may be provided by the server update module 220 of the backup manager 120, in one embodiment, or may be provided by any other suitable component, or components, in other embodiments. Additionally, the client device 110A may execute one or more instructions associated with the backup manager 120, such as an application associated with the backup manager 120, to provide the functionality described in conjunction with FIG. 4.

The backup manager 120 receives 405 backup data from a client device 110A through a backup request, as described in conjunction with step 305 of FIG. 3. The received backup data can be data not previously stored in the backup servers 130 or metadata of the previously stored data in the backup servers 130. In addition, a primary 130A and secondary 130B server associated with the client device 110A are accessed 410 by the backup manager 120. The primary 130A and secondary 130B servers can be identified through the client profile store 205.

In one example embodiment, once the backup data is received from the client device 110A, the backup manager 120 compares the received backup data to recent metadata stored in the metadata store 215. The received backup data is metadata associated with the data or metadata already stored on the servers 130A and 130B of the client device 110A. The recent metadata stored in the metadata store 215 can be a most recent copy of a backed up metadata on one of the servers 130A and 130B. Thus, the backup manager 120 can check whether a backup is even needed based on whether the received backup data matches the recent metadata. In another embodiment, if the recent metadata is similar but does not match the received backup data, only the difference between the received backup data and recent metadata will be stored.

A status of the servers 130A and 130B is received 415 by the backup manager 120. As described in conjunction with FIG. 3, a status of a server is an indication of whether the server is available to receive and backup data. The status can be received from the client device 110A or an application associated with the client device 110A and can be sent along with a backup request to the backup manager 120.

If the status indicates 420 availability of the servers 130A and 130B, the backup manager 120 identifies 425 a recipient server from the servers 130A and 130B. For example, availability of a server from 130A and 130B means that the server, either 130A or 130B, has also completely stored pre-seeded data. In another embodiment where the associated backup servers of the client device 110 include additional servers as well as the primary 130A and secondary 130B server, the recipient server is any server in the associated backup servers. For example, if the primary server 130A or secondary server 130B is no longer available to backup because of a malfunction, an offline condition, or other operational problem, the recipient server can also be a new server from the one or more servers 130 in the backup management environment 100 that is available to receive and backup data. In addition, if the primary server 130A is no longer available, the recipient server can be pre-seeded by the secondary server 130B and be designated the new secondary server for the client device 110A. Thereafter, the original secondary server 130B would be the new primary server for the client device 110A. If the secondary server 130B is no longer available, the recipient server can be pre-seeded by the primary server 130A and replace the original secondary server 130B. Identification of the new designated primary server and/or identification of the new designated secondary server can be stored in the client profile store 205 with an association to the identification of the associated client device 110A.

After identifying a recipient server based on status, the received backup data is sent or transmitted 430 to the identified recipient server. The received backup data can be metadata associated with the previously stored backup data. In the example of an initial backup data of 10 GB, the metadata, which can be 1 MB or any data amount less than 10 GB, is stored in the recipient server rather than the entire 10 GB of data. Additionally, the received backup data can be stored in the metadata store 215 along with an association to an identification of the client device 110A or identification of the server that was sent 430 the received backup data. The received backup data can replace the previously stored metadata in the metadata store 215. A time stamp associated with sending 430 the received backup data to the identified recipient server is stored in the backup log 210 with an association with an identification of the identified recipient server.

If the status indicates 420 a lack of availability of the primary 130A or secondary 130B server, the backup manager 120 can send or transmit 435 the backup data to the pre-designated server. If the pre-designated server has not completely backed up the backup data when sent the additional backup data through the second backup request, the additional backup data is not stored right away. For example, the additional backup data is sent to the pre-designated server for storage after the pre-designated server has completely backed up the backup data. If the pre-designated server has completely backed up the backup data but pre-seeding of the backup data on the secondary server has not been completed yet, the additional backup data can be stored along with the initial backup data on the pre-designated server.

Figure 5:
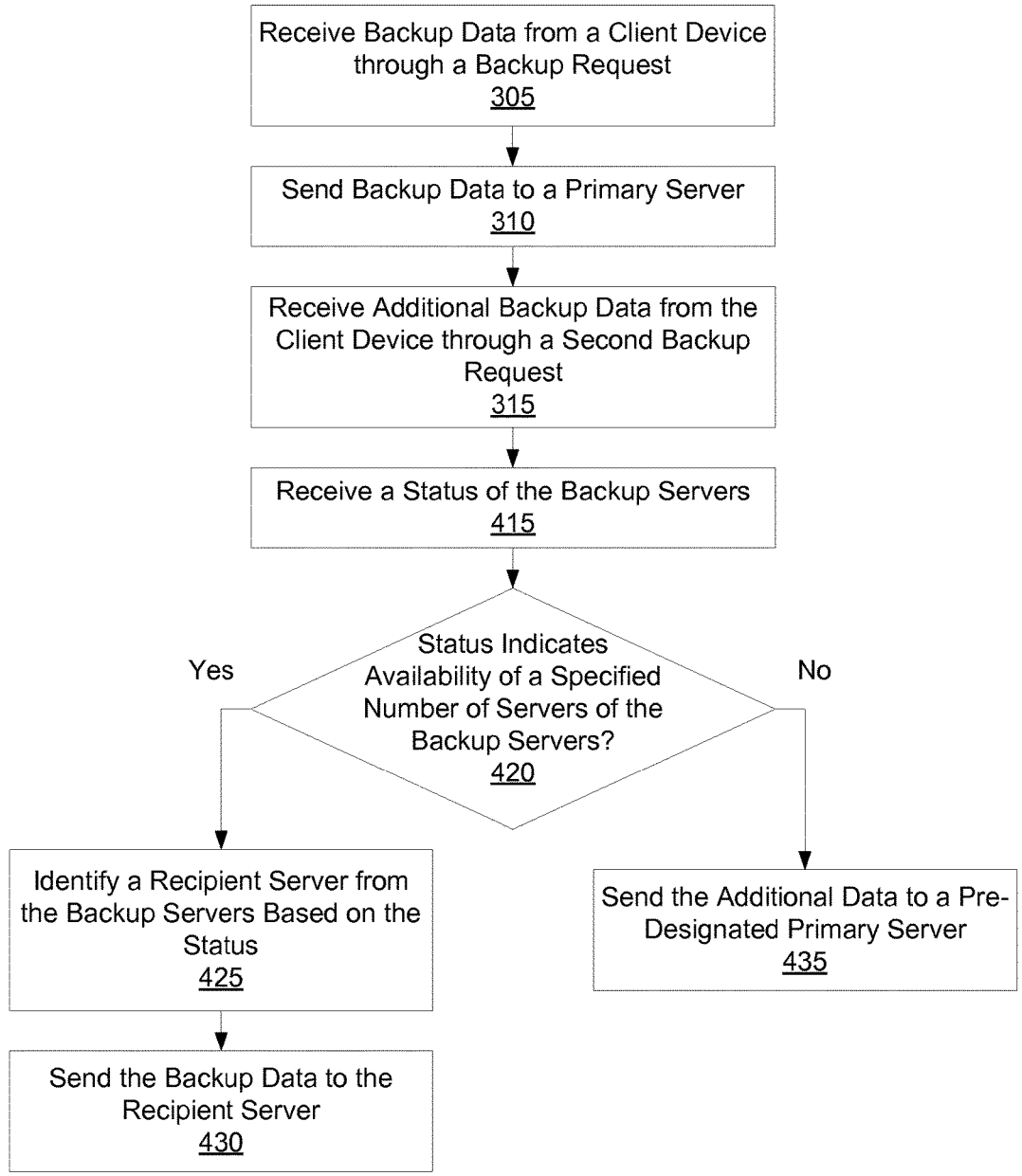
FIG. 5 illustrates a flowchart of a method for pre-seeding data for backup and determining a backup server for additional backups in accordance with an embodiment

Initial Pre-Seeding of Backup Data and Server Determination for Additional Backups Turning now to FIG. 5, it illustrates a flowchart of one embodiment of a method for pre-seeding data to one or more backup servers and determining servers for additional backups. For example, the backup manager 120 performs the method described in FIG. 4. In other embodiments, the method may include different and/or additional steps than those shown in FIG. 3, 4, or 5. The functionality described in conjunction with the backup manager 120 in FIG. 5 may be provided by the server update module 220 of the backup manager 120, in one embodiment, or may be provided by any other suitable component, or components, in other embodiments. Additionally, the client device 110A may execute one or more instructions associated with the backup manager 120, such as an application associated with the backup manager 120, to provide the functionality described in conjunction with FIGS. 3, 4, and 5.

The backup manager 120 receives 305 backup data from a client device 110A through a first backup request, sends or transmits 310 the backup data to a primary server 130A for storage, and receives 315 additional backup data from the client device 110A through a second backup request from the client device 110A, as described in conjunction with FIG. 3. After the initial backup data is stored on the primary server 130A and pre-seeded by the primary server 130A on a secondary server 130B, the backup manager 120 receives 415 a status of the primary server 130A, the secondary server 130B or any combination thereof.

If the status indicates 420 availability of servers 130A and/or 130B, the backup manager 120 identifies 425 a recipient server from the servers 130A and/or 130B. In another embodiment where the associated backup servers of the client device 110 include additional servers as well as the primary 130A and secondary 130B server, the recipient server is any server in the associated backup servers. The additional backup data is sent 430 to the identified recipient server. The additional backup data can be metadata associated with the initially stored backup data. In addition, the additional backup data can be new data, metadata, or any combination thereof. In one embodiment, responsive to the status indicating 420 lack of availability of the secondary 130B server, the backup manager 120 can send or transmit 435 the additional data to a pre-designated server or primary server 130A.

In one embodiment, the backup manager 120 can receive a first time interval and a second time interval from the client device 110A. The first time interval and second time interval are intervals at which the client device 110A automatically backs up data and can be specified by a user of the client device 110A. Alternately the intervals can be specified by an application associated with the backup manager 120 running on the client device 110A or by the backup manager 120, as described previously in conjunction with specified time intervals in FIG. 3. The received first time interval and second time interval are intervals associated with the primary server 130A and secondary 130B server, respectively.

In an example embodiment, once the pre-seeding has occurred, the backup manager 120 automatically executes backups at the first and second time intervals and stores the additional backup data at the first and second time intervals on the primary 130A and secondary 130B servers, respectively. It is noted that in this example embodiment, the primary server 130A or pre-designated server has been stored with the initial backup data and also sent the initial backup data to the secondary backup 130B for storage. The first and second time intervals can be specified by a user of the client device 110A, the client device 110A, an application running on the client device 110A, or the backup manager 120. Thus, subsequent additional backups occur based on the first and second time intervals in various embodiments.

Computing Machine Architecture

Figure 6:
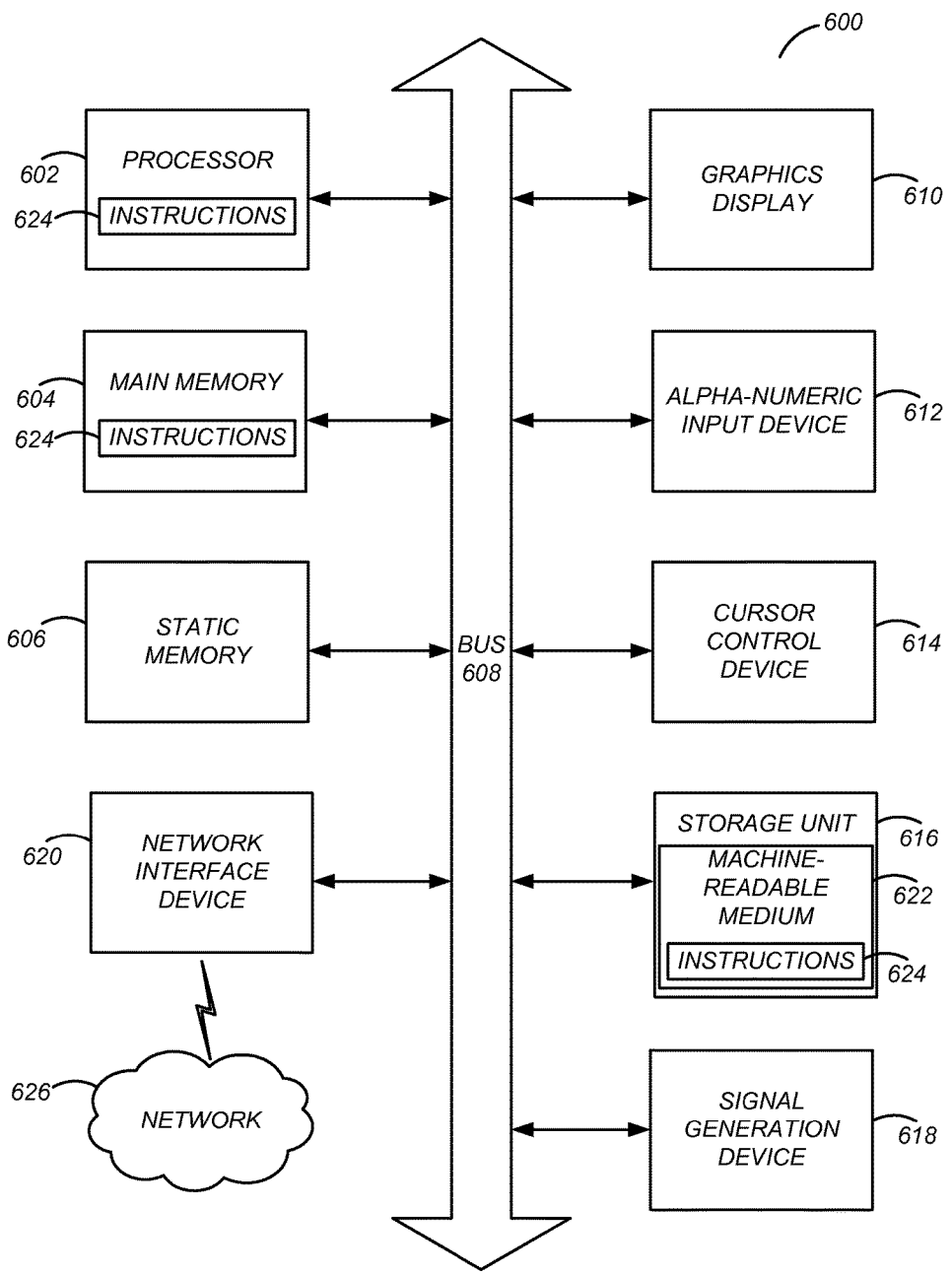
FIG. 6 illustrates components of an example machine able to read instructions from a machine-readable medium and execute them in a processor (or controller) in accordance with an embodiment.

FIG. 6 is a block diagram illustrating components of an example machine able to read instructions from a machine-readable medium and execute them in a processor (or controller). Specifically, FIG. 6 shows a diagrammatic representation of a machine in the example form of a computer system 600 within which instructions 624 (e.g., software or program code) for causing the machine to perform any one or more of the methodologies discussed herein, e.g., with FIGS. 2-5, may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes one or more processors (generally, processor 602) (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 604, and a static memory 606, which are configured to communicate with each other via a bus 608. The computer system 600 may further include graphics display unit 610 (e.g., a plasma display panel (PDP), a liquid crystal display (LCD), a projector, or a cathode ray tube (CRT)). The computer system 600 may also include alpha-numeric input device 612 (e.g., a keyboard), a cursor control device 614 (e.g., a mouse, a trackball, a joystick, a motion sensor, or other pointing instrument), a storage unit 616, a signal generation device 618 (e.g., a speaker), and a network interface device 620, which also are configured to communicate via the bus 608.

The storage unit 616 includes a machine-readable medium 622 on which is stored instructions 624 embodying any one or more of the methodologies or functions described herein. The instructions 624 may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 may be transmitted or received over a network 626 via the network interface device 120.

While machine-readable medium 622 is shown in an example embodiment to be a single medium, the term "machine-readable medium" should be taken to include a single medium or multiple media (e.g., a centralized or distributed database, or associated caches and servers) able to store instructions (e.g., instructions 624). The term "machine-readable medium" shall also be taken to include any medium that is capable of storing instructions (e.g., instructions 624) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

The system, method and computer readable storage medium disclosed herein beneficially include a more efficient and less time consuming backup process for client devices. Only changes or metadata of previously backed up data are stored on the backup servers. This minimizes time on the end of the client device during backup processes. In addition, the disclosed provides an additional safety feature for backing up data on backup servers. Instead of only backing up complete data, not only metadata, on a single backup server, the complete data is stored on a plurality of backup servers, allowing for additional backup of the complete data.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIG. 2. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 102, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for pre-seeding data to one or more backup servers and determining servers for additional backups through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for backing up data on one or more servers, the method comprising:
receiving backup data from a client device through a first backup request;
transmitting the backup data to a primary server for storage;

receiving additional backup data from the client device through a second backup request from the client device;

receiving a status of one or more backup servers associated with the client device, the one or more backup servers including the primary server;

identifying, responsive to the status indicating availability of at least one server of the one or more backup servers, a recipient server from the one or more servers;

transmitting the additional backup data to the identified recipient server;

receiving a first time interval and a second time interval from the client device, wherein a first backup interval is associated with backup of data to the primary server and a second backup interval is associated with backup of data to a secondary server;

transmitting the additional backup data to the primary server at each first backup interval; and transmitting the additional backup data to the secondary server at each second backup interval.

2. The method of claim 1, wherein the additional backup data is metadata, modified portions of the backup data, or both metadata and modified portions of the backup data associated with the backup data.

3. The method of claim 1, wherein the one or more backup servers further includes the secondary server.

4. The method of claim 1, wherein the recipient server is the secondary server.

5. A method for backing up data on one or more servers, the method comprising:

receiving backup data from a client device through a first backup request;

transmitting the backup data to a primary server for storage;

receiving additional backup data from the client device through a second backup request from the client device;

receiving a status of a secondary server;

transmitting, responsive to the status indicating availability of the secondary server, the additional data to the secondary server; and transmitting, responsive to the status indicating lack of availability of the secondary server, the additional data to the primary server.

6. The method of claim 5, further comprising:

receiving a first time interval and a second time interval from the client device, a first backup interval associated with backup of data to the primary server and a second backup interval associated with backup of data to the secondary server;

transmitting additional backup data to the primary server at each first backup interval; and transmitting additional backup data to the secondary server at each second backup interval.

7. The method of claim 5, wherein the primary server sends the backup data to the secondary server for storage responsive to completely storing the backup data on the primary server.

8. The method of claim 5, wherein the additional backup data is metadata, modified portions of the backup data, or both metadata and modified portions of the backup data associated with the backup data.

9. The method of claim 5, wherein the status indicates availability of the secondary server to receive based on whether the primary server completely stored the backup data received through the first backup request.

10. The method of claim 5, wherein the additional data is transmitted to the primary or secondary server responsive to the status of the primary or secondary server claiming complete storage of backup data locally, the additional backup data comprising metadata but not backup data.

11. A method for backing up data on one or more servers, the method comprising:

receiving backup data from a client device through a backup request;

accessing one or more backup servers associated with the client device;

receiving a status of the one or more backup servers;

identifying, responsive to the status indicating availability of at least one server of the one or more backup servers, a recipient server from the one or more backup servers;

transmitting the backup data to the identified recipient server;

receiving a first time interval and a second time interval from the client device, wherein a first backup interval is associated with backup of data to the primary server and a second backup interval is associated with backup of data to the secondary server;

receiving additional backup data from the client device through an additional backup request, the additional backup request comprising a time stamp;

transmitting the additional backup data to the primary server if the time stamp is associated with the first backup interval; and transmitting the additional backup data to the secondary server if the time stamp is associated with the second backup interval.

12. The method of claim 11, wherein the backup data is metadata, modified portions of previous backup data, or both metadata and modified portions of the previous backup data.

13. The method of claim 11, wherein the status further comprises a claim of complete storage of an initial backup data locally.

14. The method of claim 11, wherein the backup request further comprises a time stamp and the recipient server is identified based on the time stamp associated with the backup request.

15. A non-transitory computer readable storage medium comprising instructions to backup data on one or more servers, the instructions when executed by a processor causes the processor to:

receive backup data from a client device through a first backup request;

transmit the backup data to a primary server for storage;

receive additional backup data from the client device through a second backup request from the client device;

receive a status of one or more backup servers associated with the client device, the one or more backup servers including the primary server;

identify, responsive to the status indicating availability of at least one server of the one or more backup servers, a recipient server from the one or more servers; and transmit the additional backup data to the identified recipient server;

receive a first time interval and a second time interval from the client device, wherein a first backup interval is associated with backup of data to the primary server and a second backup interval is associated with backup of data to a secondary server;

transmit additional backup data to the primary server at each first backup interval; and transmit additional backup data to the secondary server at each second backup interval.

16. The non-transitory computer readable storage medium of claim 15, wherein the additional backup data is metadata, modified portions of the backup data, or both metadata and modified portions of the backup data associated with the backup data.

17. The non-transitory computer readable storage medium of claim 15, wherein the one or more backup servers further includes the secondary server.

18. A non-transitory computer readable storage medium comprising instruction to back up data on one or more servers, the instructions when executed by a processor causes the processor to:
receive backup data from a client device through a first backup request;
transmit the backup data to a primary server for storage;
receive additional backup data from the client device through a second backup request from the client device;
receive a status of a secondary server;
transmit, responsive to the status indicating availability of the secondary server, the additional data to the secondary server; and
transmit, responsive to the status indicating lack of availability of the secondary server, the additional data to the primary server.

19. The non-transitory computer readable storage medium of claim 18, further comprising instructions that when executed by the processor causes the processor to, further comprising:
receive a first time interval and a second time interval from the client device, a first backup interval associated with backup of data to the primary server and a second backup interval associated with backup of data to the secondary server;
transmit additional backup data to the primary server at each first backup interval; and
transmit additional backup data to the secondary server at each second backup interval.

20. A non-transitory computer readable storage medium comprising instruction to back up data on one or more servers, the instructions when executed by a processor causes the processor to:
receive backup data from a client device through a backup request;
access one or more backup servers associated with the client device;
receive a status of the one or more backup servers;
identify, responsive to the status indicating availability of at least one server of the one or more backup servers, a recipient server from the one or more backup servers;
transmit the backup data to the identified recipient server;
receive a first time interval and a second time interval from the client device, wherein a first backup interval is associated with backup of data to the primary server and a second backup interval is associated with backup of data to the secondary server;
receive additional backup data from the client device through an additional backup request, the additional backup request comprising a time stamp;
transmit additional backup data to the primary server if the time stamp is associated with the first backup interval; and
transmit additional backup data to the secondary server if the time stamp is associated with the second backup interval.

21. A non-transitory computer readable storage medium storing program code comprising instructions for backing up data on one or more servers, the instructions when executed by a processor causing the processor to:
receive backup data from a client device through a first backup request;
transmit the backup data to a primary server for storage;
receive additional backup data from the client device through a second backup request from the client device;
receive a status of one or more backup servers associated with the client device, the one or more backup servers including the primary server;
identify, responsive to the status indicating availability of at least one server of the one or more backup servers, a recipient server from the one or more servers; and
transmit the additional backup data to the identified recipient server responsive to completely storing the backup data on the primary server.

22. The computer readable storage medium of claim 21, wherein the additional backup data is metadata, modified portions of the backup data, or both metadata and modified portions of the backup data associated with the backup data.

23. The computer readable storage medium of claim 21, wherein the one or more backup servers further includes the recipient server.

24. The computer readable storage medium of claim 21, wherein the recipient server is a secondary server.

25. A non-transitory computer readable storage medium storing program code comprising instructions for backing up data on one or more servers, the method comprising:
receive backup data from a client device through a first backup request;
transmit the backup data to a primary server for storage;
receive additional backup data from the client device through a second backup request from the client device;
receive a status of one or more backup servers associated with the client device, the one or more backup servers including the primary server;
identify, responsive to the status indicating availability of at least one server of the one or more backup servers, a recipient server from the one or more servers, wherein the status indicates availability of the recipient server to receive based on whether the primary server completely stored the backup data received through the first backup request; and
transmit the additional backup data to the identified recipient server.

26. The non-transitory computer readable storage medium of claim 25, wherein the additional backup data is metadata, modified portions of the backup data, or both metadata and modified portions of the backup data associated with the backup data.

27. The non-transitory computer readable storage medium of claim 26, wherein the one or more backup servers further includes the recipient server.

28. The non-transitory computer readable storage medium of claim 27, wherein the recipient server is a secondary server.

29. The non-transitory computer readable storage medium of claim 25, further comprising instructions that when executed by the processor causes the processor to:
transmit, responsive to the status indicating lack of availability of the secondary server, the additional backup data to the recipient server for storage.

30. A method for backing up data on one or more servers, the method comprising:
receiving backup data from a client device through a first backup request;
transmitting the backup data to a primary server for storage;

receiving additional backup data from the client device through a second backup request from the client device;

receiving a status of one or more backup servers associated with the client device, the one or more backup servers including the primary server;

identifying, responsive to the status indicating availability of at least one server of the one or more backup servers, a recipient server from the one or more servers;

transmitting the additional backup data to the identified recipient server; and transmitting, responsive to the status of the identified recipient server claiming complete storage of backup data locally, the additional backup data to the identified recipient server, the additional backup data comprising metadata but not backup data.

31. The method of claim 30, wherein the additional backup data is metadata, modified portions of the backup data, or both metadata and modified portions of the backup data associated with the backup data.

32. The method of claim 30, wherein the one or more backup servers further includes the recipient server.

33. The method of claim 30, wherein the recipient server is a secondary server.

34. A non-transitory computer readable storage medium comprising instructions to backup data on one or more servers, the instructions when executed by a processor causes the processor to:

receive backup data from a client device through a first backup request;

transmit the backup data to a primary server for storage;

receive additional backup data from the client device through a second backup request from the client device;

receive a status of one or more backup servers associated with the client device, the one or more backup servers including the primary server;

identify, responsive to the status indicating availability of at least one server of the one or more backup servers, a recipient server from the one or more servers;

transmit the additional backup data to the identified recipient server; and transmit, by the primary server, the backup data to the recipient server for storage in response to execution of instructions to store the backup data on the primary server.

35. The non-transitory computer readable storage medium of claim 34, wherein the additional backup data is metadata, modified portions of the backup data, or both metadata and modified portions of the backup data associated with the backup data.

36. The non-transitory computer readable storage medium of claim 34, wherein the one or more backup servers further includes the recipient server.

* * * * *

UNITED STATES PATENT AND TRADEMARK OFFICE
CERTIFICATE OF CORRECTION

PATENT NO. : 9,747,163 B2
APPLICATION NO. : 14/682089
DATED : August 29, 2017
INVENTOR(S) : Anand Apte et al.

It is certified that error appears in the above-identified patent and that said Letters Patent is hereby corrected as shown below:

In the Claims

Column 17, Line 37, Claim 20 after "comprising" delete "instruction" and replace with --instructions--

Signed and Sealed this
Twenty-fourth Day of July, 2018

Andrei Iancu
*Director of the United States Patent and Trademark Office*